April 2, 1963  F. F. DE MERS  3,083,754
CONVOLUTION FORMING MACHINE
Filed June 24, 1959
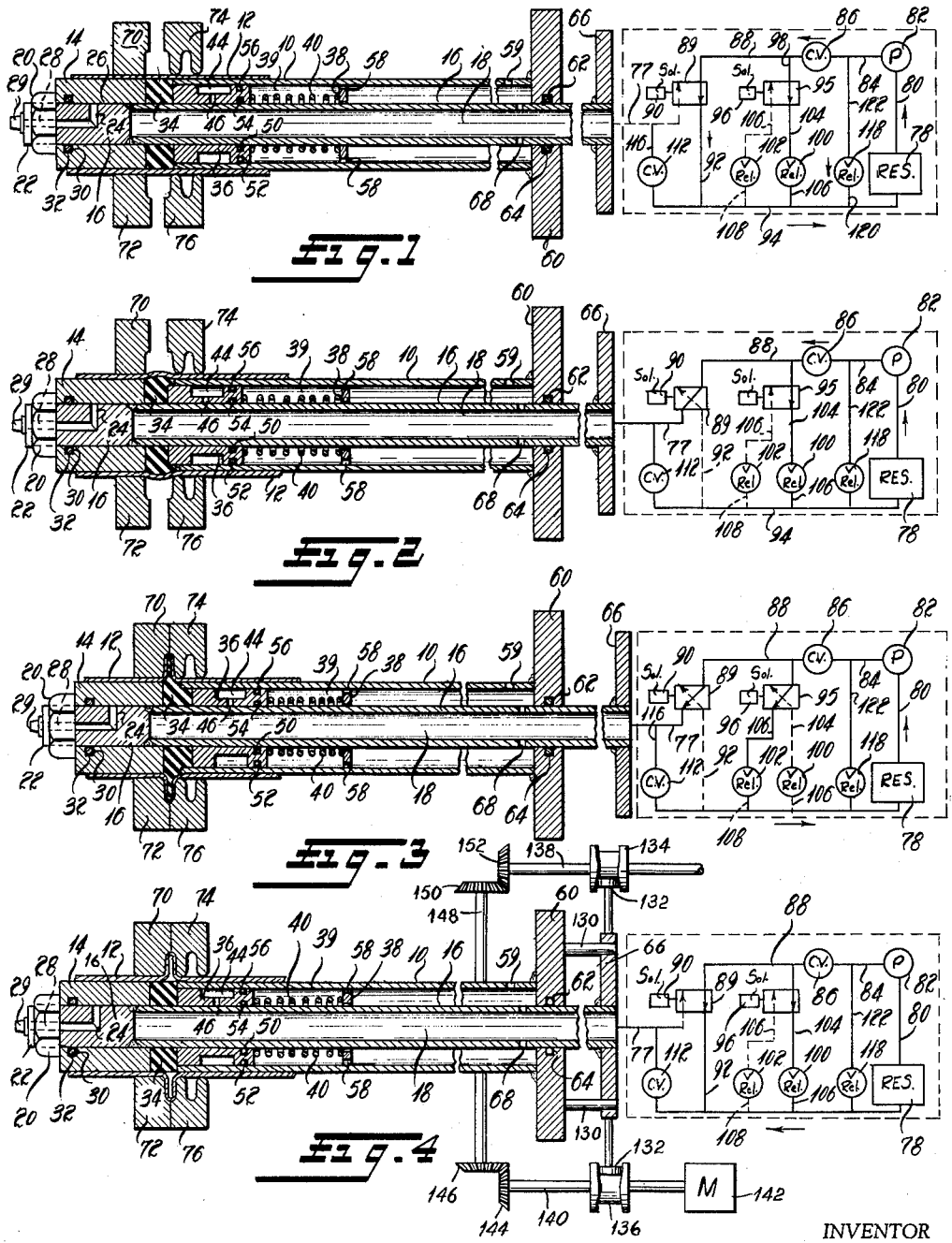
INVENTOR
FRANCIS F. DEMERS
BY
ATTORNEYS 3,083,754
CONVOLUTION FORMING MACHINE
Francis F. De Mers, Escondido, Calif., assignor to Solar Aircraft Company, San Diego, Calif., a corporation of California
Filed June 24, 1959, Ser. No. 822,570
6 Claims. (Cl. 153—73)

This invention relates to methods and apparatus for forming sheet metal and more particularly to methods and apparatus for continuously and automatically forming a series of single convolutions in a tubular workpiece.

In Patent No. 2,773,538, issued to applicant on December 11, 1956, a hydraulically operated convolution forming machine was described in which hollow, flexible forming means consisting of a thin-walled, resilient gasket or diaphragm was used to form the desired convolution in the workpiece. While such a machine produces satisfactory convolutions, the thin-walled gasket or diaphragm becomes worn and may eventually rupture, thus releasing oil (hydraulic fluid) to the surrounding area and necessitating repair time to disassemble the mandrel, replace the gasket and clean up the work area.

While there are convolution forming machines known which employ solid resilient members to form the workpiece and which do not present the problem discussed above, there are no known machines which avoid the rupture problem and yet possess the numerous advantages of the hydraulically operated mechanism described in said Patent No. 2,773,538. Such prior devices deform the solid resilient forming die by purely mechanical action. In compression, the rubber material of the solid die seeks to relax by forcing the workpiece outwardly, thus forming the desired convolution. Unless the positive movement of the mechanical components is controlled with extreme exactness, they will exert too little or too great pressure on the die. Too little pressure results in a "short" convolution, while too great a pressure overly compresses the rubber of the die, creating deleteriously high temperatures and stressing the metal of the workpiece longitudinally, thus resulting in misformed, unsatisfactory convolutions and scrap.

It is accordingly a primary object of the present invention to provide improved methods and means for forming convolutions in a tubular workpiece possessing substantially all the advantages of the hydraulically operated convolution forming machine described in Patent No. 2,773,538, while eliminating the tendency of the convolution forming means to rupture.

Another object is to provide novel convolution forming apparatus which automatically regulates the force applied to the workpiece while solving oil leakage and rupture problems on the one hand and problems of rapid deterioration of the convolution forming means due to excessive pressure and heat on the other.

Still another object of the present invention is to provide improved methods and means for forming single convolutions in a tubular workpiece permitting relaxation of operating pressure tolerances and comprising a substantially incompressible elastic die and a hydraulic back-up system for the die which is capable of absorbing the force on the die in excess of that necessary to form convolutions in the workpiece, thus precluding deleterious effects on the workpiece and die.

Further objects and advantages will become apparent as the description proceeds in connection with the accompanying drawings in which:

FIGURE 1 is a sectional view taken along the longitudinal axis of the mandrel of the instant convolution forming machine and showing the relationship of the workpiece and the convolution forming mechanism when said mechanism is in its first or "idle" position and also showing schematically an automatic hydraulic control circuit for operating the associated convolution forming machine;

FIGURE 2 is a view similar to that shown in FIGURE 1 but wherein said convolution forming mechanism is in its second or "bulge" position;

FIGURE 3 is a view similar to FIGURE 1 but wherein said convolution forming mechanism is in its third or "form" position; and FIGURE 4 is a view similar to that shown in FIGURE 1 but wherein said convolution forming mechanism is in its fourth or "idle" position.

The present invention comprises methods and apparatus for forming convolutions in tubular workpieces between an inner substantially incompressible elastic die and outer inelastic dies which are appropriately moved during the forming operation and which are shifted during the interval between forming operations to position an unformed portion of the workpiece in surrounding relation with the inner elastic forming die. The present invention is primarily concerned with an inner die and control assembly of novel construction and with the novel cooperation of the inner die structure with the outer die structure. The outer dies and the apparatus for controlling their movement throughout the operating cycle are preferably identical with the corresponding elements disclosed in detail in applicant's prior Patent No. 2,773,538 and accordingly will not be described in detail here.

Referring now more particularly to the drawings, a stationary support or mandrel 10 is shown, whose outer diameter is substantially equal to the inner diameter of workpiece 12, one end of which is shown positioned on the end of the mandrel. Another portion of workpiece 12 is positioned around a movable piston 14, which is of the same diameter as mandrel 10. A piston rod 16 having an internal bore 18 is mounted within movable piston 14 and has an outer diameter substantially equal to the inner diameter of said movable piston. A retaining nut 20 is secured to a threaded extension 22 of piston rod 16, said retaining nut overlapping movable piston 14 and thus acting as a stop retaining the piston on the piston rod. A lubricant duct 24 communicating with the interface 26 between piston rod 16 and movable piston 14 is provided in said piston rod and communicates with a corresponding lubricant duct 28 in extension 22 which is provided with an appropriate fitting 29. An annular groove 30 is provided in the bore surface of piston 14 and contains an O-ring 32 to prevent detrimental leakage.

Situated between and in contact with both movable piston 14 and mandrel 10 is a substantially incompressible elastic die 34 which is constructed of a solid, rubbery material such as neoprene or similar material. The inner diameter of die 34 is such that there will be a sliding fit between the die and piston rod 16 around which the die is positioned. The outer diameter of the die is approximately equal to the outer diameter of movable piston 14 and mandrel 10.

Situated in sliding engagement with both the bore surface of mandrel 10 and the outer periphery of piston rod 16 is an annular floating plunger 36. Welded to the inner periphery of mandrel 10 is an annular stationary back-up ring 38 which is spaced radially from the outer periphery of piston rod 16 sufficiently to permit passage therethrough of said piston rod 16. A normally slightly compressed spring 40 is positioned in mandrel cavity 39 around piston rod 16 and exerts a force upon floating plunger 36 sufficient to urge said plunger into light contact with die 34.

Floating plunger 36 is provided along the central portion of its outer periphery with an annular recess 44, which serves to store lubricating oil which may be introduced through a bleed hole (not shown) in mandrel 10, said bleed hole being sealed with a set screw during normal operation of the mechanism. A radial duct 46 provided in floating plunger 36 establishes communication between annular recess 44 and the bore of floating plunger 36 to lubricate plunger 36 and piston rod 16. Floating plunger 36 is also provided with annular grooves 50 and 52 at one end thereof at its inner and outer peripheries, respectively, containing O-rings 54 and 56 which seal against piston rod 16 and mandrel 10, respectively. Stationary back-up ring 38 is provided with a series of holes 58 to permit hydraulic fluid to enter mandrel cavity 39. Bleed hole 59 is provided in mandrel 10 between stationary back-up ring 38 and attaching flange 60 to allow air is escape while the mandrel cavity 39 is initially filled but is sealed with a set screw (not shown) when the cavity is filled.

An attaching flange 60, welded to the end of mandrel 10 and in sliding, sealing engagement with piston rod 16 by virtue of O-ring 62 positioned in annular groove 64 in the flange is adapted to be rigidly bolted to a support mechanism forming part of the operating mechanism with which the instant convolution forming mechanism is adapted to be used. Beyond attaching flange 60 is attaching flange 66, which is welded to piston rod 16 and which is mounted for sliding movement on rods 130 carried by the attaching flange 60. At its opposite sides the plate 66 carries cam rollers 132 which fit within cam tracks formed on cams 134 and 136 mounted for rotation with shafts 138 and 140 respectively, which are suitably supported by bearings not shown. The shaft 140 is driven by a motor 142, the drive being transmitted by bevel gears 144 and 146 through shaft 148 and bevel gears 150 and 152 to the shaft 138 to rotate the shafts 138 and 140 in synchronism. The cams 134 and 136 are so proportioned as to produce the desired stroke of the movable piston 14 when the motor 142 is in operation. The motor 142 may be operated manually or by conventional automatic means in timed relation to the remainder of the system. Piston rod 16 is provided with apertures 68 between attaching flange 60 and stationary back-up ring 38 to permit flow of hydraulic fluid into mandrel cavity 39.

A pair of laterally and longitudinally movable female dies 70 and 72 loosely engage workpiece 12 about its entire circumference. A second pair of female dies 74 and 76 similarly engage workpiece 12 in an area longitudinally spaced from dies 70 and 72.

Internal bore 18 in piston rod 16 is connected to a fluid conduit 77 which communicates with a hydraulic operating system to be presently described. As is shown in FIGURE 1, hydraulic fluid is supplied from a reservoir 78 through a conduit 80, a pump 82 (driven by any suitable means, not shown), conduit 84, normally open check valve 86, conduit 88 into valve 89, which is controlled by solenoid 90. When solenoid 90 is not energized, hydraulic fluid is directed into conduit 92 and back to reservoir 78 by means of conduit 94. Solenoid 90 is adapted, when energized by a limit switch (not shown), to direct the hydraulic fluid into conduit 77, which conduit leads directly into the internal bore 18 in piston rod 16.

Valve 95, which is controlled by solenoid 96, is connected by means of conduit 98 to conduit 88 at the downstream side of check valve 86 and is in turn connected to a low pressure relief valve 100 and a high pressure relief valve 102 by means of conduits 104 and 106, respectively. When solenoid 96 is deenergized, hydraulic fluid is directed to the low pressure relief valve 100 (see FIGURES 1, 2 and 4). When actuated by a limit switch (not shown), solenoid 96 operates valve 95 to direct hydraulic fluid to the high pressure relief valve 102. (See FIGURE 3.) Both low pressure and high pressure relief valves 100 and 102 are normally closed but are adapted, when the system pressure reaches predetermined levels, to direct hydraulic fluid into conduit 94 and back to reservoir 78 by means of conduits 106 and 108, respectively.

A normally closed check valve 112, establishing communication between reservoir 78 and conduit 77 through conduits 94 and 116, respectively, is adapted to permit hydraulic fluid to flow from reservoir 78 into the internal bore 18 in piston rod 16. A relief valve 118 establishes communication between the reservoir 78 and a point intermediate pump 82 and check valve 86 by means of conduits 120 and 122, respectively, to provide fail-safe protection.

In operation, the convolution forming mechanism heretofore described has four basic positions: (1) idle (2) bulge (3) form (4) idle.

The first "idle" position is illustrated in FIGURE 1. When the machine is idling, i.e. when a tubular workpiece is being positioned on mandrel 10, hydraulic fluid is pumped through a closed circuit from reservoir 78, through conduit 80, pump 82, check valve 86, conduit 88, valve 89, conduit 92 and back to the reservoir through conduit 94. During this stage of operation, die 34 is in its relaxed position and the workpiece is, at this point, undeformed. As more fully described in Patent No. 2,773,538, it is during this stage of operation that female dies 70, 72, 74 and 76 are positioned adjacent the workpiece as shown in FIGURE 1.

During the second or "bulge" stage of operation (see FIGURE 2), solenoid 90 is actuated by means of a limit switch (not shown) and the hydraulic fluid passing through conduit 88 is directed through conduit 77 into the internal bore 18 in piston rod 16 while, at the same time, communication between conduits 92 and 88 is interrupted. The hydraulic fluid passes through apertures 68 in piston rod 16, through holes 58 in stationary back-up ring 38 and into mandrel cavity 39. The hydraulic fluid urges plunger 36 against die 34 with sufficient force to displace the die radially to create a bulge in the workpiece as is clearly shown in FIGURE 2. A predetermined "bulge" pressure is assured by bleed through the low pressure relief valve 100, which is in the hydraulic circuit at this point of the operation. This operation is completed in approximately one-half second and results in work-hardening of the workpiece in the immediate area of the bulge.

If, at this point, with no greater hydraulic pressure, female dies 70 and 72 were moved toward female dies 74 and 76, respectively, and piston 14 were also moved to the right, the force of the positive movement of piston 14 would displace die 34 bodily to the right. The net result would be a "short" convolution, leading to a rejected part.

It is to avoid this situation that the hydraulic system is provided with a high pressure "forming" relief valve 102, which is adapted to be switched into the circuit as low pressure relief valve 100 is switched out. More specifically, in the third or "form" stage of operation of the instant convolution forming mechanism (see FIGURE 3), dies 70 and 72 and piston rod 16 (the latter pulling with it piston 14) are simultaneously moved to the right end, simultaneously therewith, a limit switch is actuated energizing solenoid 96, switching high pressure relief valve 102 into the hydraulic circuit and switching out low pressure relief valve 100. The result of the foregoing and the effect of the positive force of piston 14 on die 34 is to radially displace the bulged portion of the workpiece 12 into the space formed between the mating surfaces of dies 70 and 72 and 74 and 76, respectively, thus forming a single convolution. However, as movement of the piston 14 tends to further compress die 34 beyond a certain predetermined maximum, the die displaces axially in the direction of floating plunger 36 which, in turn, transmits a force to the hydraulic fluid, opening the high pressure relief valve 102 and allowing bleed of hydraulic fluid to reservoir 78.

If, for example, a force "X" is required to create the pressure necessary to deform the workpiece the desired degree, the high pressure relief valve 102 is preset at X lbs. and, as the positive movement of piston 14 ultimately exerts a force exceeding X lbs. on die 34, the excess force results in a retreat (movement to the right) of floating plunger 36, opening high pressure relief valve 102 and permitting bleed of hydraulic fluid therethrough to reservoir 78. The result is a balancing of forces in mandrel cavity 39, resulting in formation of the desired convolution without deleterious effects to the workpiece 12 or die 34. This phase of the cycle is completed in approximately one second.

Following this third or "form" stage of operation, the limit switches on solenoids 90 and 96 are both tripped, de-energizing both of said solenoids, thus cutting mandrel cavity 39 out of the pressure circuit and returning the low pressure relief valve 100 into the hydraulic circuit (see FIGURE 4). This hydraulic circuit is therefore identical to that described above in connection with FIGURE 1.

Simultaneously with the de-energizing of solenoids 90 and 96, piston rod 16 is returned to the left to its normal position, said piston rod being followed by piston 14 which is urged to the left by the normal action of spring 40 against floating plunger 36 and die 34. Die 34 displaces to fill the area created by leftward movement of piston 14, thus tending to create a vacuum in mandrel cavity 39. The actual creation of such a vacuum is precluded by the flow of hydraulic fluid from the reservoir 78, through check valve 112. This condition is maintained during the approximately two and one-half seconds required for the re-positioning of dies 70, 72, 74 and 76 and the workpiece in preparation for the start of another convolution forming cycle, as is more particularly described in Patent No. 2,773,538.

As aforestated, relief valve 118 is provided in the hydraulic system to contribute a fail-safe feature to the instant system. The pressure required to open this fail-safe valve is, of course, higher than that required to operate high pressure relief valve 102.

The specifications of the various elements used in the instant convolution forming mechanism may be varied within reasonable limits. Mandrel 10, for example, may be of any reasonable diameter to accommodate a workpiece of a given diameter, the remaining components of the assembmly being designed correspondingly to the particular mandrel used. The pressures utilized in the system are, of course, dependent upon the diameter, wall thickness, composition of the workpiece, as well as the desired height of the convolutions to be formed.

As an example of typical specifications, if it is desired to form convolutions having a height of 0.4" in a 3" diameter tube of AISI type 321 stainless steel of 0.010" wall thickness, the following specifications are preferred:

Mandrel: 2.98" O.D.
Die 34: 2.98" O.D. x 0.952" width 30 Shore hardness.
Spring: for all conditions, only sufficient force to maintain a snug relation between floating plunger 36, die 34 and piston 14.
Hydraulic pressure: low pressure relief valve, approximately 333 p.s.i.; high pressure relief valve, approximately 400 p.s.i.
Piston force: any force exerting a pressure of more than 400 p.s.i.

The instant convolution forming mechanism and associated hydraulic fluid system may be directly substituted for the corresponding convolution forming mechanism and hydraulic fluid system described in said Patent No. 2,773,538. The manner of effecting the substitution of the instant system for its counterpart in said patent may be clearly demonstrated by reference to FIGURES 17 and 25 of that patent. Thus, attaching flanges 60 and 66 of the instant mechanism (see FIGURE 1) correspond to supporting member 70 and 166, respectively, of the patent (see FIGURE 17), and the hydraulic fluid system described in the instant case substituted for the hydraulic system disclosed in FIGURE 25 of the patent. Limit switches similar to switches 287 and 291 of Patent No. 2,773,538 may be used to energize and de-energize solenoids 90 and 96, respectively, of the instant system. The manner of operation of the system as a whole is adequately described in said patent and need not be repeated herein.

Various modifications may, of course, be made without departing from the spirit of the instant invention. For example, while experience has demonstrated that an elastic die having a solid, unitary rubbery structure is preferred, other substantially incompressible elastic bodies may be used, such for example as a series of concentrically arranged thin rubber disks. And while the convolution forming mechanism is shown as containing a spring in mandrel cavity 39 for the purpose of urging floating plunger 36 against die 34, this spring is not essential to the system but is merely provided to prevent unnecessary movement of floating plunger 36 and to make piston 14 move to the left as a unit with piston rod 16.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and equivalency of the claims are therefore intended to be embraced therein.

What is claimed and desired to be secured by United States Letters Patent is:

1. Apparatus for forming convolutions in a tubular workpiece comprising a substantially incompressible, elastic die adapted to be positioned internally of said workpiece, first and second pistons in surface contact with the opposite sides of said die, means mounting said pistons for movement toward and away from each other to deform and release said die, means forming a fluid filled expansible chamber at one side of said second piston, means for establishing a first pressure of predetermined value in said chamber to deform said die radially outward to form a bulge in said workpiece, mechanical drive means for positively moving said first piston toward said second piston to further deform said die, and means for establishing a second pressure of predetermined constant value in said expansible chamber higher than said first pressure during the movement of said first piston toward said second piston.

2. A mandrel structure for use in apparatus for forming wall convolutions in a tubular workpiece comprising, a substantially incompressible solid elastic annular die adapted to be positioned internally of said workpiece, first pressure applying means comprising a piston positioned on one side of said die and adapted to be urged axially against said die, a piston rod rigid with said piston in sliding engagement with the inner surface of said die, second pressure applying means comprising an annular floating plunger slidably mounted on said piston rod and positioned on the other side of said die, and means to supply fluid under predetermined pressure against said floating plunger to urge it axially against said die in opposition to said piston and to cause said die to be displaced radially outwardly in the direction of said workpiece to form a convolution therein.

3. The mandrel structure according to claim 2 wherein said piston rod is hollow and serves as a conduit to direct fluid against said second pressure applying means to urge it against said die.

4. Mandrel structure for use in apparatus for forming wall convolutions in a tubular workpiece comprising; a substantially incompressible elastic die adapted to be positioned internally of said workpiece; a first movable abutment in engagement with one side of said die, mechanical means for moving said first abutment positively through an advance and retract stroke of predetermined length, a second movable abutment in engagement with the other side of said die, means to supply fluid under predetermined pressure against said second abutment to urge said second abutment axially against said die in opposition to said first abutment and to cause said die to displace radially outward in the direction of said workpiece to form a convolution therein; said last-mentioned means including means for relieving that amount of pressure in said fluid which is in excess of said predetermined pressure during the advance stroke of said first movable abutment.

5. Mandrel structure for use in apparatus for forming wall convolutions in a tubular workpiece comprising, a substantially incompressible solid elastic annular die adapted to be positioned internally of said workpiece, first pressure applying means comprising a piston positioned on one side of said die and adapted to be urged axially against said die, a piston rod rigid with said piston in sliding engagement with the inner surface of said die, second pressure applying means comprising an annular floating plunger slidably mounted on said piston rod and positioned on the other side of said die, and means to supply fluid under predetermined pressure against said floating plunger to urge it axially against said die in opposition to said piston and to cause said die to be displaced radially outwardly in the direction of said workpiece to form a convolution therein, said means comprising a low pressure relief valve and a high pressure relief valve, and means for operating said valves to maintain a predetermined relatively low pressure during the initial movement of said piston and a predetermined higher pressure during final movement of said piston.

6. The mandrel structure according to claim 4 additionally comprising a plurality of female die means adapted to be positioned externally of said workpiece and to receive the portion of the workpiece which is urged radially outwardly upon said radial displacement of said die, whereby a convolution in the workpiece is formed.

References Cited in the file of this patent

UNITED STATES PATENTS

| | | |
|---|---|---|
| 1,879,663 | Dreyer | Sept. 27, 1932 |
| 2,306,018 | Feutress | Dec. 22, 1942 |
| 2,417,202 | Hull et al. | Mar. 11, 1947 |
| 2,581,787 | Dreyer | Jan. 8, 1952 |
| 2,773,538 | De Mers | Dec. 11, 1956 |
| 2,783,727 | Hoffman | Mar. 5, 1957 |
| 2,827,007 | Wurzburger | Mar. 18, 1958 |